G. A. SEAVER, & J. C. MILLIGAN.
Cutlery-Handles.

No. 148,900.         Patented March 24, 1874.

WITNESSES:
A. Bennemendorf
Alex F. Roberts

INVENTOR:
G. A. Seaver
BY J. C. Milligan
ATTORNEYS

UNITED STATES PATENT OFFICE.

GEORGE A. SEAVER, OF NEW YORK, N. Y., AND JOHN C. MILLIGAN, OF SOUTH ORANGE, NEW JERSEY.

IMPROVEMENT IN CUTLERY-HANDLES.

Specification forming part of Letters Patent No. 148,900, dated March 24, 1874; application filed February 28, 1874.

*To all whom it may concern:*

Be it known that we, GEORGE A. SEAVER, of the city, county, and State of New York, and JOHN C. MILLIGAN, of South Orange, in the county of Essex and State of New Jersey, have invented a new and Improved Cutlery-Handle, of which the following is a specification:

Our invention consists of two concavo-convex pieces of sheet metal, with flat margins, combined with the tang of a knife, fork, or other article, to form a handle, the pieces being placed one on each side of the tang, with the convex side outward, and secured by lapping the edges of one over the edges of the tang and on the margins of the other, and stamping or pressing them together, thus making a strong and durable handle, with the requisite amount of swell, of thin sheet metal, by a cheaper method than is now used.

Figure 1:
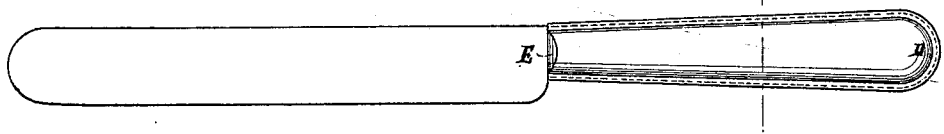
Figure 2:
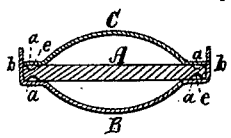
Figure 3:
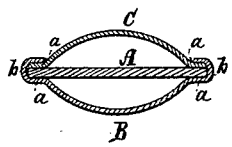

Figure 1 is a side elevation of a table-knife with a handle constructed according to our improvement. Fig. 2 is a cross-section, showing the two parts of the handle and the tang as arranged for fastening them; and Fig. 3 is a cross-section of the handle in its complete state.

Similar letters of reference indicate corresponding parts.

A represents the tang; B, the lower half, and C the upper half, of the handle. These two parts of the handle are struck out of sheet metal, in the semi-elliptic form in cross-section required to give the necessary swell to the handle when placed in the relation to the tang shown in the drawing. They are also shaped in the oval form at the outer end D, corresponding to the sides. At the other end they will be beveled down in the form of a bolster, as at E, to close them down to the blade, or shaped in any other approved form. The bulged portions are not quite as wide as the tang, in order to leave a narrow margin, $a$, to rest on the tang at its margin. These margins $a$ terminate at the edges of the tang; but one of the parts is continued in a flange, $b$, which is turned upward across the edges of the tang, and a short distance above the other part, as in Fig. 2. When the parts are placed in position, then the whole is placed in a press, and the flange $b$ turned down on the margin $a$ of the other portion of the handle, as clearly shown in Fig. 3, securing the whole together.

In practice, the dies of the press for fastening the handle will probably be so cut as to strike up an ornamental bead around the lap-jointed edges of the handle; and to facilitate this, the tang may have grooves $e$ stamped in it before the handle-plates are put on, into which the plates may be pressed.

Having thus described our invention, we claim as new and desire to secure by Letters Patent—

The handle for cutlery composed of the tang A and the two bulged plates of thin metal, all secured together by the turned-over and pressed-down edges of one of the said plates, all constructed and arranged as set forth.

GEO. A. SEAVER.
      J. C. MILLIGAN.

Witnesses:
 C. SEDGWICK,
 T. B. MOSHER.